June 7, 1927.  
G. M. STONE  
1,631,837  
POWER TRANSMISSION MECHANISM FOR MOTOR VEHICLES  
Filed March 17, 1925  2 Sheets-Sheet 1
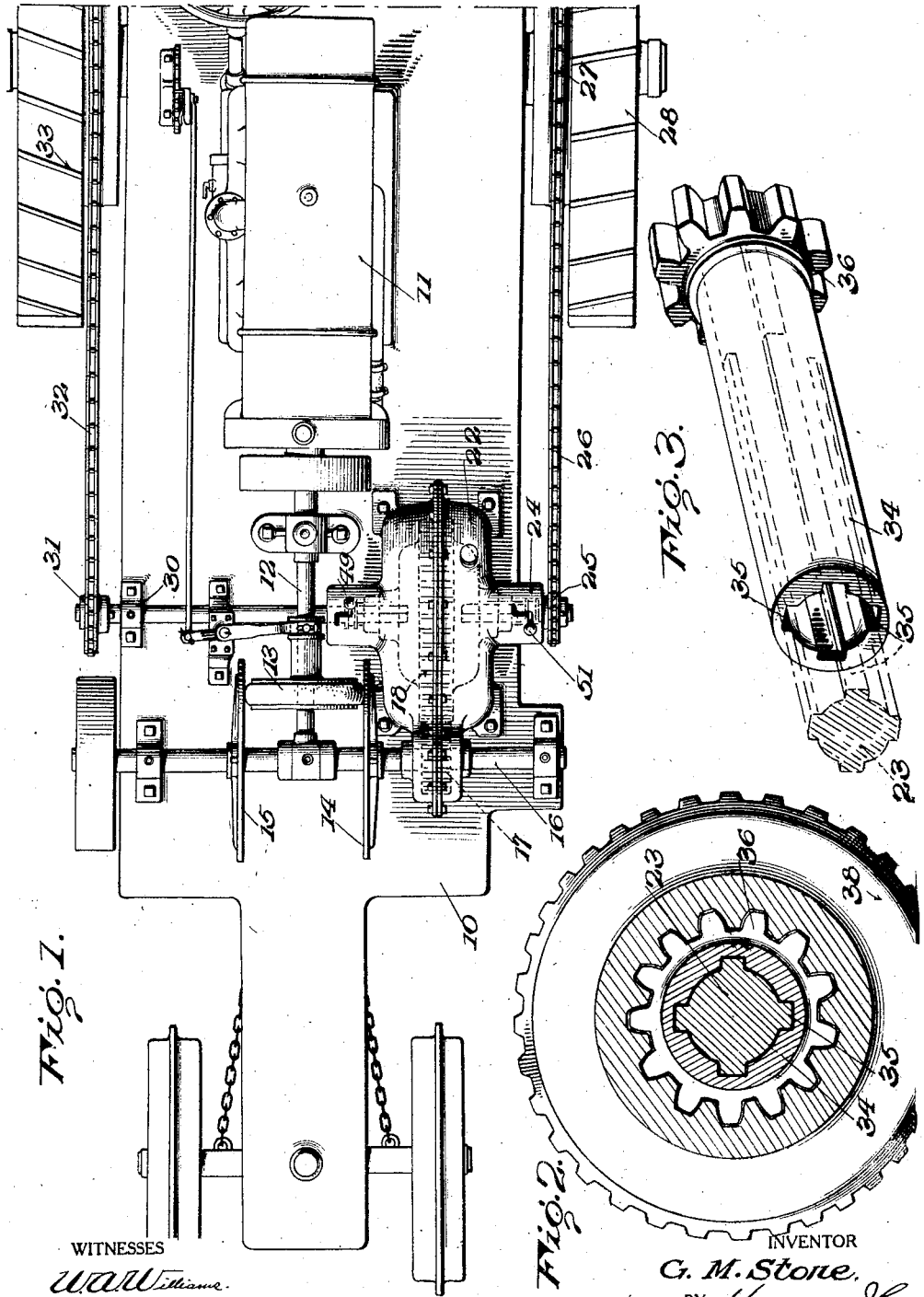

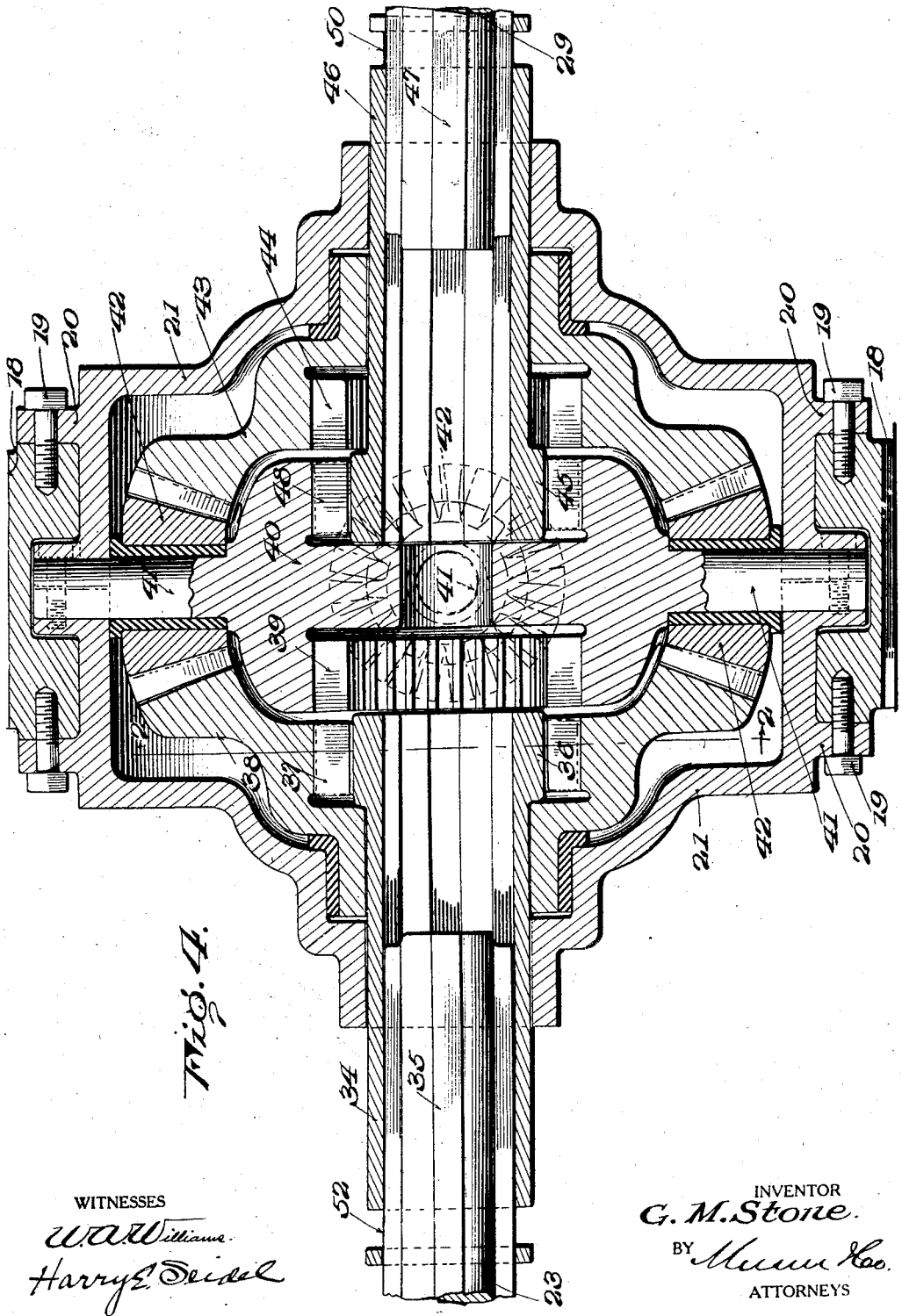

Patented June 7, 1927.

1,631,837

UNITED STATES PATENT OFFICE.

GEORGE MONROE STONE, OF GRISWOLD, IOWA.

POWER-TRANSMISSION MECHANISM FOR MOTOR VEHICLES.

Application filed March 17, 1925. Serial No. 16,221.

This invention relates to an improved power transmission or drive mechanism for motor vehicles such as tractors, motor trucks or the like as described and claimed in my Patent 1,137,549, dated April 27, 1915.

An object of the invention is the provision of a mechanism for transmitting power from a suitable drive shaft to the axles of a vehicle so that the two sections or axles may be driven simultaneously and at equal speeds in one direction or in opposite directions or whereby one of the sections may be driven while the other section remains stationary thus effectively permitting the shaft or vehicle to be propelled forwardly or backwardly or in event of the vehicle requiring a short angular turn the same may be propelled at substantially a right angle to its preceding line of travel.

A further object of the invention is the provision of a device for transmitting power from a suitable drive shaft to the axles of a vehicle and in which either of the axles may be driven simultaneously and at equal speeds by the usual differential mechanism, said differential embracing an instrumentality to cause either of the axles to be positively driven.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a plan view of a tractor showing my invention applied thereto.

Figure 2 is a transverse vertical section taken along the line 2—2 of Figure 4.

Figure 3 is a view in perspective of a sleeve slidable and keyed to a driven shaft.

Figure 4 is a longitudinal vertical section of a differential embracing my improved mechanism for transmitting power.

Referring more particularly to the drawings, 10 designates a frame upon which is mounted an engine 11 for rotating a drive shaft 12. This shaft operates a friction disc 13 which in turn drives friction discs 14 and 15. The disc 14 drives a shaft 16 mounted in bearings on the frame. The shaft 16 drives a gear 17 which meshes with a ring gear 18 removably secured by means of bolts 19 to flanges 20 formed upon a sectional differential casing 21. This casing is located within a housing 22 bolted to the frame 10.

A shaft 23 projecting from one end of the differential casing 21 extends through the housing 22 and is mounted in bearings 24 on frame 10 and is provided with a sprocket 25 which drives a chain 26. This chain is connected with a sprocket 27 on a rear tractor wheel 28. Another shaft 29 extends from the opposite end of the differential casing 21, projects through the housing 22 and is mounted in bearings 30 on the frame 10 and drives a sprocket 31 which in turn drives a chain 32. This chain drives the other tractor wheel 33. Slidable on the shaft 23 is a sleeve 34. This sleeve is provided with grooves adapted to receive keys 35 which permit the sleeve to slide upon the shaft but cause the sleeve to drive the shaft when said sleeve is revolved.

The inner end of the sleeve is provided with a clutch element 36 which is adapted to mesh with a clutch element 37 of a differential gear 38. The gear 36 also meshes with a clutch element 39 formed in the differential spider 40. The spider is provided with four arms 41 upon which are rotatably mounted gears 42 meshing with the differential gear 38 and a differential gear 43. The gear 43 has a clutch element 44 adapted to engage with a clutch element 45 on the inner end of a sleeve 46 which is slidable on the shaft 29 and is locked with shaft 29 by means of keys 47 which permit sliding of the sleeve on the shaft but will cause said sleeve to revolve the shaft 29 when said sleeve is rotated.

A clutch element 48 is formed within a recess in the spider 40 which is opposite to the gear 39 and is adapted to engage with clutch element 45 when the sleeve 46 is moved inwardly by means of a yoke 49 engaging the groove 50 in said sleeve. A yoke 51 engages a groove 52 in the sleeve 34 and is adapted to cause the sleeve to slide in opposite directions longitudinally of the axis of the shaft 23.

The operation of my device is as follows:

A driving shaft 16 causes the gear 17 to rotate the differential casing 21 in the usual manner by means of the gear 18 secured to said casing. Revolution of the casing causes rotation of the gears 42 on the arms 41 of the spider which in turn rotate the gears 38 and 43. When both of the clutch elements 36 and 45 are in meshing relation with the respective clutch elements 37 and 44 of the differential, gear 38 and the clutch element 48 of the differential gear 43, driving of the axles will be substantially identical with that disclosed by the ordinary differential or equalizing gear.

When the clutch element 45 is moved into engaging relation with the gear 48 as shown in Figure 4 the differential or equalizing feature of the device is destroyed and the power will all be applied to shaft 29 for causing driving of the wheel 33 while when the clutch element 36 of sleeve 34 is moved into engaging relation with the clutch element 39 the differential action will be destroyed and all the power will be applied to shaft 23, that is, provided that the sleeve 46 has been moved outwardly with the clutch element 45 engaging with the clutch element 44. But in either case the differential gear 38 or 43 will idle when either of the clutch elements on the shaft engages with the clutch elements formed in the differentials. When either of the clutch elements 36 or 45 are in engaging relation with the clutch elements 39 or 48 respectively of the spider 40 the wheel which is being driven will cause a vehicle to turn at an angle to its former path of travel as is determined by the operator of the vehicle.

When both of the clutch elements 36 and 45 have been moved into engaging relation with the respective clutch elements 39 and 48, both shaft sections are locked through the differential spider and the shaft sections are driven as a single shaft.

What I claim is:

In a power transmission mechanism, the combination with a differential casing, means for rotating the casing, a pair of differential gears, a spider, pinions on the spider meshing with the gears, the spider and pinions operatively connecting the casing with the gears for causing rotation of said gears, shafts extending into the casing, sleeves slidable on the shafts and keyed to the shafts, said sleeves being provided with clutch elements, said spider having oppositely disposed clutch elements, the differential gears being provided with clutch elements opposite the clutch elements on the spider, means for causing the clutch elements of the sleeves to engage a clutch element on the differential gear or a clutch element on the spider, when a sleeve is moved along its respective shaft for causing one of the shafts to be positively driven or for simultaneously driving both shafts independently of the differential.

GEORGE MONROE STONE.